(12) United States Patent
Thygesen

(10) Patent No.: US 6,974,847 B1
(45) Date of Patent: Dec. 13, 2005

(54) MELT COMPOUNDED FUSION BONDED MARINE ANTI-FOULING COATING

(75) Inventor: Jacky T. Thygesen, Jupiter, FL (US)

(73) Assignee: Matrix Engineering, West Palm Beach, FL (US)

( * ) Notice: Subject to any disclaimer, the term of this patent is extended or adjusted under 35 U.S.C. 154(b) by 375 days.

(21) Appl. No.: 10/196,620

(22) Filed: Jul. 16, 2002

(51) Int. Cl.[7] ............................ C08K 3/08; C08K 3/22; C08L 63/00; C09D 5/16
(52) U.S. Cl. .................. 523/458; 106/1.17; 106/14.42; 106/14.44
(58) Field of Search ............................ 106/1.17, 14.42, 106/14.44; 523/458

(56) References Cited

U.S. PATENT DOCUMENTS

| | | | |
|---|---|---|---|
| 4,020,200 A | 4/1977 | Groszek et al. | 427/416 |
| 4,110,117 A | 8/1978 | McLeod | 106/1.17 |
| 4,544,581 A | 10/1985 | Pelloski | 427/383.7 |
| 4,891,394 A * | 1/1990 | Savin | 523/442 |
| 5,008,146 A * | 4/1991 | Keohan | 428/328 |
| 5,009,757 A | 4/1991 | Riffe et al. | 204/147 |
| 5,922,113 A | 7/1999 | Van Gestel | 106/18.33 |
| 6,063,849 A * | 5/2000 | Morris et al. | 524/432 |

FOREIGN PATENT DOCUMENTS

| | | | |
|---|---|---|---|
| EP | 61223 A | * | 9/1982 |
| JP | 63-176894 A | * | 7/1988 |
| WO | WO 97/00919 A1 | * | 1/1997 |

OTHER PUBLICATIONS

Santanaga et al., "Study of the pigment type effect on the corrosion behavior of epoxy painted steel/sea water systems," Anti-Corrosion Methods and Materials (1999), vol. 46, No. 6, abstract.*

* cited by examiner

Primary Examiner—Robert Sellers
(74) Attorney, Agent, or Firm—Brian S. Steinberger; Law Offices of Brian S. Steinberger, P.A.

(57) ABSTRACT

Anti-fouling coating composition containing high amounts of zinc, and novel methods of applying melt compounded anti-fouling coating compositions to components by heat fusion techniques. The components that can be treated include fresh water or salt water exposed components that are prone to biomass and fouling buildup. The marine exposed components can include running gear components, such as but not limited to, propellers, rudders, struts, shafts, bow thrusters, boat hulls (fiberglass or metallic) and the like.

6 Claims, 1 Drawing Sheet

MELT COMPOUNDED FUSION BONDED MARINE ANTI-FOULING COATING

This invention relates to antifouling, and in particular to antifouling coatings and methods of applying melt compounded coatings to water exposed structures and surfaces for antifouling applications.

BACKGROUND AND PRIOR ART

Anti-fouling techniques have become increasingly desirable in recent years for anything that may be exposed to marine conditions. All types of underwater structures and/or surfaces that are exposed to sea water or fresh water, have a tendency for allowing undesirable marine growth to attach thereon. Most common types of undesirable marine growth include but are not limited to algae, tube worms, barnacles, sponges and hydroids. These types of growth often will attach themselves to the underwater structures and/or surfaces causing erosion, excessive frictional resistance, and cavitation effects.

Various types of techniques from electrodes to coatings have been proposed over the years to prevent marine growth. For example many techniques have involved different type of coatings and/or electrochemical systems for attempting anti-fouling effects. See U.S. Pat. No. 4,020,200 to Groszek et al.; U.S. Pat. No. 4,110,117 to McLeod; U.S. Pat. No. 4,544,581 to Pelloski; U.S. Pat. No. 5,008,146 to Keohan; U.S. Pat. No. 5,009,757 to Riffe et al.; U.S. Pat. No. 5,992,113 to Van Gestal; and U.S. Pat. No. 6,063,849 to Morris et al.

However, these techniques are primarily concerned with treating hulls and/or large surface/structures. The prior art is not specifically directed toward protecting specific types structures and surfaces that constantly are in movement within water environments and/or smaller water exposed components. These techniques are also generally limited to wet coatings that are painted on components. The subject inventor is not aware of any adequate prior art technique that adequately protects components such as propellers, rudders, struts, shafting, bow thrusters, and similar components for anti-fouling effects in this manner.

SUMMARY OF THE INVENTION

A primary objective of the invention is to provide an antifouling coating and/or method of applying such coating that is a self-polishing, melt compounded, epoxy based, heat reactive and thermosetting.

A secondary objective of the invention is to provide an antifouling coating and/or method of applying such coating that can be applied to underwater structures and surfaces that include metallic and nonmetallic materials.

A third objective of the invention is to provide an antifouling coating and/or method of applying such coating that can be applied to underwater structures and surfaces that constantly move within water type environments.

A fourth objective of the invention is to provide an antifouling coating and/or method of applying such coating for underwater structures and surfaces that are exposed to either sea water and/or fresh water.

A fifth objective of the invention is to provide antifouling coating and/or method of applying such coating for prohibiting undesirable marine growths such as algae, tube worms, barnacles, sponges and hydroids, and the like.

A sixth objective of the invention is to provide antifouling coating and/or method of applying such coating that can be used with water exposed components such as propellers, rudders, struts, shafts, bow thrusters, and the like.

A preferred embodiment of the novel anti-fouling coating composition includes Zinc, Titanium dioxide, and an epoxy material, wherein the composition is useful for anti-fouling applications on water exposed components. The zinc component can include approximately 20% to approximately 80% zinc dust and approximately 0.5% to approximately 20% zinc oxide. The coating can also include approximately 0.5% to approximately 20% of the toly biguanide, O—, and less than approximately 0.1% of the cadmium. The water exposed components can include marine running gear, a propeller, a rudder, a strut, a shaft, and a bow thruster.

A novel method of applying an anti-fouling coating can include the steps of pre-cleaning a running gear component by at least one of: using a mechanical tool, applying heat, applying a solvent, and abrasive media to the running gear, removing remaining residual deposits on the running gear, and applying a melt compounded coating composition that can include zinc, to the running gear, wherein the coating composition has anti-fouling effects to the running gear. The running gear can be a propeller, a rudder, a strut, a shaft, and a bow thruster.

The step of pre-cleaning the running gear can include the step of using a handtool, which can be selected from at least one of: a needle gun, a scraper, a disk sander, and abrasive blasting. The pre-cleaning step can be solely using the step of applying the heat to a metallic component, by applying heat of approximately 190.6° C. to approximately 300° C., until the running gear is completely dried, and contaminants on the gear have reached a chalky dry state. The step of removing the remaining residual deposits can include the step of: using an abrasive cleaning media such as aluminum oxide in the abrasive cleaning media. The melt compounded coating composition can be formed on the substrate surface of the component by curing the coating between approximately 190.6° C. and approximately 300° C., and preferably at less than approximately 232.2° C. The coating composition can be applied by electrostatic deposition and followed by heating the coating and substrate component. Novel heating techniques can include inserting the component in an oven. Further heating techniques can include using a flame spraying system to apply the melt compounded coating composition to the substrate component.

Further objects and advantages of this invention will be apparent from the following detailed description of a presently preferred embodiment which is illustrated schematically in the accompanying drawings.

DESCRIPTION OF THE PREFERRED EMBODIMENTS

Figure 1:
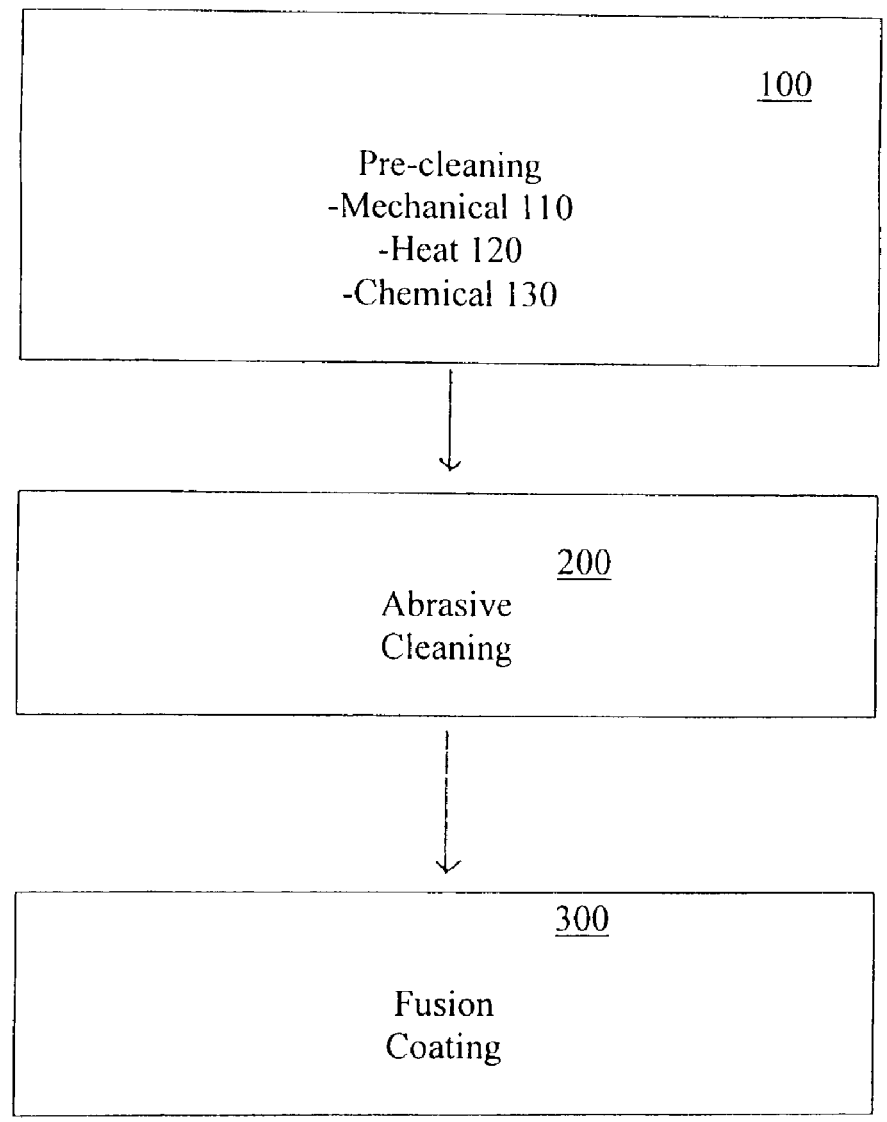
FIG. 1 is a flow chart of the preferred steps of applying the novel coating composition.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Coating Composition

The term "phr" is defined as a weight measurement of "parts per hundred resin"(by weight) and relates to total resin in a coating powder including any curative which becomes part of the cured resin.

The invention applies to "fusion type coating processes." In particular, a preferred embodiment of the self-polishing, melt compounded, epoxy based, heat reactive, thermosetting marine antifouling coating composition includes (a) approximately 20% to approximately 80% by solid weight of zinc (Zn) dust;

(b) approximately 0.5% to approximately 30% by solid weight of titanium dioxide($TiO_2$);

(c) approximately 0.5% to approximately 20% by solid weight of zinc oxide(ZnO);

(d) approximately 15% to approximately 20% by solid weight of Toly Biguanide, O—;

(e) approximately 15% to approximately 25% epoxy resin; and (f) less than approximately 0.1% by solid weight of cadmium(Cd)

The types epoxy resin can include but not be limited to epoxy resins that can be useful for coating powders such as, but not limited to, those that can be produced by a reaction of epichlorohydrin or polyglycidyl ether and an aromatic polyol such as but not limited to bisphenol (for example, bisphenol A).

Such epoxy resins can be produced for example by an etherification reaction between and aromatic or aliphatic polyol and epichlorohydrin or dichlorohydrin in the presence of an alkali such as caustic soda.

The aromatic polyol can have for example, bis(4-hydroxyphenyl)-2.2-propane (i.e. bispenol A). bishydroxypheny)-1,1-ethane, bis(4-hydroxyphenyl)-1,1-isobutane. Bis(4-hydroxy-t-butylphenyl)-2,2-propane, bis(2-hydroxynapthyl)methane-4.4-dihydroxybenzophenone or 1.5-pentanediol. 1.6-hexanedio, diethylene glycol, triethylene glycol, polyethylene glycol, polypropylene glycol or dipropylene glycol. For example digycidyl ethers or condensed glycidyl ethers of such diols can be used.

A primary requirement for the epoxy coating powder is that it be capable of carrying high levels of zinc metal in either powder or flake form. For example, the epoxy coating powder must be capable of carrying at least approximately 75 phr Zn and preferably at least approximately 100 phr Zn, and up to the carrying capacity of epoxy resin which would be up to approximately 250 phr Zn.

A further requirement is that the epoxy coating powder fuse and cure at approximately 162.8° C. or below, and preferably at approximately 148.9° C. and below.

One such useful type of epoxy coating powder based on bispheol A uses CASAMINE OTB as a curative. The epoxy binder can provide adherence to the substrate surface and adhesion of zinc particles or flakes.

Coating powder should be provided sufficient to provide a minimum coating of at least approximately 2 mils, preferably at least approximately 5 mils up to approximately 8 mils.

Melt Compounded Method of Applying Coating Composition

The invention applies to "fusion type coating processes" where the coating composition is melt compounded. In particular, a preferred embodiment of the self-polishing, melt compounded, epoxy based, heat reactive, thermosetting marine antifouling coating composition includes (a) approximately 20% to approximately 80% by solid weight of zinc (Zn) dust;

(b) approximately 0.5% to approximately 30% by solid weight of titanium dioxide($TiO_2$);

(c) approximately 0.5% to approximately 20% by solid weight of zinc oxide(ZnO);

(d) approximately 15% to approximately 20% by solid weight of o-Tolyl Biguanide;

(e) approximately 15% to approximately 25% epoxy resin; and (f) less than approximately 0.1% by solid weight of cadmium(Cd)

Dry free flowing powders can be used in the fusion coating process which is defined as coating processes in which the coating composition can be distributed over a substrate (which may be hot or cold) and heat supplied from the substrate or an external source fuses the coating into a continuous film.

There are several methods that can be used for applying the fusion coating. One example can include applying the material in a powder form using an electrostatic gun which causes the particles to positively charge thereby causing an attractive force toward the negatively charged component. This causes an opposites attract situation whereby the particles cling to the component and subsequent heating melts then fuses the coating to the component.

The heat can be supplied to the coating and substrate by various methods such as by placing the component in a convection oven, using a heat gun, a flame spray system, induction heating and the like. The time it takes to heat can range from approximately 5 minutes up to approximately 60 minutes or more depending on the overall mass of the object and the coating thickness that is used.

The novel coating composition is most useful for treating running gear components, such as but not limited to a propeller, a rudder, a strut, a shaft, and a bow thruster, and the like. The invention can be applicable to any substrates that are exposed to fresh or sea water prone to biomass fouling.

The novel coating composition can be applied for use on large structures and/or surfaces such as a constructed boat hulls, and the like. For example, after large panels are pre coated except for an approximately 3" margin around the panel to allow for the welding process to join the panels together forming the hull, the welded area would need to be abrasively cleaned, and then the compound flame sprayed to bond the coating on each adjacent panel and coating on the welded areas together thereby creating an envelope containing the steel structure.

FIG. 1 is a flow chart of the preferred steps of applying the novel coating composition. First Step 100 includes preliminary pre-cleaning of the components by applying a mechanical cleaning technique 110, and/or applying heat 120 and/or applying a chemical solution.

A combination of all three 110, 120 and 130 can be employed in worst cases of contamination in order to ensure the removal of all surface contaminates such as but not limited to biomass buildup, chlorides, oils and oxidation, and the like in order to achieve the highest state of cleanliness.

Mechanical cleaning 110 can include but not limited to use of hand tools, such as but not limited to scrapers, disk sanders, and the like. The mechanical cleaning 110 is used to remove the majority of the biomass such as but not limited to barnacles, tube worms, and the like and any other unwanted organisms, prior to the heat technique 120, with the time to clean being dependent upon the mass of the component being treated.

Applying heat 120 should only be used on metal components and not on nonmetal components. The heat should be at least approximately 190.6° C. up to approximately 300° C. to completely dry and break down solid and liquid contaminants until the contaminants reach a chalky dry type state. The time needed to apply heat is also dependent on the mass of the component. For example, a size 24" propeller would take approximately 1 hour of heat or 30 minutes for a 10" propeller.

Applying a chemical solution 130 can include the use of low flash type liquid such as isopropyl alcohol to remove the chalky residue from heat cleaning such that, when full evaporation occurs, the solvent does not leave an oily residue on the surface of the substrate. The solvents can include, but not be limited to, methyl ethyl ketone, isopropyl alcohol, xylene and the like. Generally, the chemical solution can be applied and instantly removed from the component.

The abrasive cleaning step 200 is the final step of preparation and provides the ability to remove any remaining residual deposits and, at the same time, equally important, provide an anchor tooth profile on the substrate thereby increasing the substrate/coating bond strength and impact resistance. The anchor tooth profile can be defined as the surface texture created when abrasive cleaning is completed using aluminum oxide or aluminum oxide type based medias. Surface cleanliness should be at approximately SSPC SP-10, near white to approximately SSPC SP-5, white metal, where SSPC refers to the Society For Protective Coatings, and SP-10 would be the level of cleanliness defined as near white metal.

The anchor tooth profile should be approximately 0.5 mils to approximately 2.0 mils (approximately 0.0005 inches to approximately 0.002 inches) when measured with a profile meter with an approximately 60 degree point. At least two samples per production day should be taken of the abrasive media, each one ounce by volume, placed in a clear vial. A sufficient volume of distilled water in order to cover the entire sample of media should then be added. There should be approximately ½ inch of distilled water above the level of the media. Shake and allow the mixture to settle. The sample should be viewed with a back light. The inspector can be looking for discoloration and/or an oily sheen in and on the surface of the distilled water. This ensures that residual contamination from the abrasive cleaning process is not being left on the surface of the substrate during abrasive cleaning. The remainder of the coating process should be done in such a manner as to minimize cross/re-contamination (such as using latex gloves or at a minimum lint free rags) while handling the components.

Components should be supported in a manner conducive to handling said components utilizing a minimum of handling and movement from one situation to another. In some cases, the components being addressed can weight up to approximately several hundreds of pounds or more and can be extremely awkward to lift and maneuver.

The final fusion coating step 300 allows for a single layer of cured coating composition containing at least approximately 75 phr zinc in powder or flake form. The coating can be applied as a coating powder where it is fused and cured at component/part temperatures between approximately 190.6° C. to approximately 300° C., and preferably at or below approximately 232.2° C. The cured layer can be at least approximately 2 mils thick up to approximately 8 mils thick, and preferably can be approximately 5 mils in thickness. A preferable method of deposition for the novel zinc and epoxy(resin) containing coating composition would be by electrostatic attraction that can include but not be limited to being accomplished by a handheld gun, an automated booth, and the like. The time for fusion curing is dependent upon the mass of the component and can range from approximately 5 minutes to approximately 60 minutes. For example, a 24" propeller can take approximately 25 to approximately 30 minutes in this final step.

In an application of the above steps, a component such as a propeller to be treated can be initially pre-cleaned where biomass is removed mechanically. Next the component can be heat cleaned. Next the component can be solvent cleaned, which is followed by the component being abrasively cleaned. Next, the component can be supported and the coating be pre-heated. Next the coating can be applied and then cured. The coating can be cooled at room temperature and the component can be visually inspected. The layering of the applied coating can be up to approximately 0.008 inches.

The novel invention coating composition can be useful for underwater structures and/or surfaces that can be exposed to seawater, and/or to fresh water, which have a tendency for undesirable marine growth. The types of undesirable marine growth include but are not limited to algae, tube worms, barnacles, sponges and hydroids which can attach themselves causing erosion to the surfaces, excessive frictional resistance, and cavitation.

Although ovens are preferably used for melt compounding the coating onto small components, the invention can be used outside the oven type chambers where a flame spraying system automatically can melt the material as it is being applied to the substrate component.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An anti-fouling coating composition, comprising:
   approximately 35% to approximately 80% by weight zinc dust;
   approximately 0.5% to less than 10% by weight zinc oxide;
   Titanium dioxide; and
   an epoxy resin, wherein the composition is useful as a coating layer for anti-fouling applications on water exposed components that include marine running gear components for preventing undesirable marine growth on the components.

2. The anti-fouling coating composition of claim 1, further comprising:
   less than approximately 0.1% by weight cadmium.

3. The anti-fouling coating composition of claim 1, wherein the marine running gear includes at least one selected from the group consisting of:
   a propeller, a rudder, a strut, a shaft, and a bow thruster.

4. The anti-fouling coating composition of claim 3, comprising:
   approximately 15% to approximately 25% by weight epoxy resin.

5. The anti-fouling coating composition of claim 4, wherein the coating composition forms a coating powder sufficient to provide a minimum coating layer on the running gear component of at least approximately 2 mils in thickness.

6. The anti-fouling coating composition of claim 5, wherein the coating composition forms a coating powder sufficient to provide a coating layer on the running gear of between approximately 5 mils to approximately 8 mils in thickness.

* * * * *